United States Patent [19]
Jin

[11] Patent Number: 6,118,329
[45] Date of Patent: Sep. 12, 2000

[54] NEGATIVE CHARGE PUMP USING POSITIVE HIGH VOLTAGE

[75] Inventor: Kyoung Chon Jin, Seoul, Rep. of Korea

[73] Assignee: Hyundai Electronics Industries Co., Ltd, Kyungki-Do, Rep. of Korea

[21] Appl. No.: 08/953,045

[22] Filed: Oct. 17, 1997

[30] Foreign Application Priority Data

Oct. 17, 1996 [KR] Rep. of Korea ...................... 96-46453

[51] Int. Cl.⁷ ..................................................... G05F 3/02
[52] U.S. Cl. .......................................... 327/536; 327/537
[58] Field of Search .................................. 327/534, 535, 327/536, 537; 307/110

[56] References Cited

U.S. PATENT DOCUMENTS

| | | | |
|---|---|---|---|
| 4,636,930 | 1/1987 | Bingham et al. | 363/60 |
| 4,777,577 | 10/1988 | Bingham et al. | 363/60 |
| 4,797,899 | 1/1989 | Fuller et al. | 375/219 |
| 4,807,104 | 2/1989 | Floyd et al. | 363/59 |
| 5,041,739 | 8/1991 | Goto | 327/536 |
| 5,237,209 | 8/1993 | Brewer | 307/110 |
| 5,399,928 | 3/1995 | Lin et al. | 327/434 |
| 5,461,557 | 10/1995 | Tamagawa | 363/60 |
| 5,493,543 | 2/1996 | Kamens | 368/255 |
| 5,532,640 | 7/1996 | Okunaga | 327/537 |

*Primary Examiner*—Terry D. Cunningham
*Attorney, Agent, or Firm*—Scott C. Harris, Esq.

[57] ABSTRACT

This invention diecloses a negative charge pump comprises a negative charge pump comprises; a positive charge pump to output a positive voltage through a first output terminal in response to a first clock signal and a second clock signal; a transfer circuit having a second output terminal, in which the transfer circuit acts to transfer the positive voltage to the second output terminal or break the positive voltage in response to a third clock signal; a negative charge pump circuit having a third output terminal which maintains a first potential during the second output terminal maintains the positive voltage or maintains a second potential in response to a fourth clock signal during the positive voltage is not supplied to the second output terminal; and an output circuit having a fourth output terminal, in which the output circuit acts to charge positive charges which exist in an external equipment to the third output terminal through the fourth output terminal when the first potential changes to the second potential.

7 Claims, 2 Drawing Sheets

NEGATIVE CHARGE PUMP USING POSITIVE HIGH VOLTAGE

FIELD OF THE INVENTION

This invention relates to a negative charge pump. In more particular, the present invention relates to a negative charge pump that can improve pumping efficiency and decrease the size of a semiconductor memory device.

BACKGROUND OF THE INVENTION

Description of the Prior Art

Generally, a positive or negative voltage, which is generated by a charge pump, is required to program or erase a flash memory device. The charge pump is classified into a positive charge pump and a negative charge pump. A conventional negative charge pump generates a negative voltage using a zero (0) through five (5) voltage. Such a negative charge pump has a drawback in that difference of voltage down is small. To overcome the drawback, a negative charge pump having a plurality of diodes and capacitors has been developed. The diodes are connected in series from each other and each capacitor is connected to a connection point of the diodes. The conventional negative charge pump has a drawback in that size of the memory device is increased due to a plurality of capacitors. Also, the conventional negative charge pump has another drawback in that it is difficult to obtain a desired negative voltage since each diode has a threshold voltage.

SUMMARY OF THE INVENTION

Therefore, it is an object of the present invention to provide a negative charge pump that can solve the above drawbacks by generating a negative voltage using a positive charge pump.

To achieve described object, the negative charge pump according to the present invention comprises a positive charge pump to output a positive voltage through a first output terminal in response to a first clock signal and a second clock signal, a transfer circuit acting to transfer the positive voltage of the first output terminal of the positive charge pump to a second output terminal thereof or break the positive voltage in response to a third clock signal, a negative charge pump circuit having a third output terminal which maintains a first potential during the second output terminal maintains the positive voltage or maintains a second potential in response to a fourth clock signal during the positive voltage is not supplied to the second output terminal.

The negative charge pump further comprises an output circuit acting to charge positive charges to the third output of the negative charge pump through a fourth output terminal thereof when the first potential changes to the second potential.

The positive charge pump comprises a first, second and fourth transistors connected in series between a supply power source and the first output terminal, a first capacitor connected to a connection node of the first and second transistors and receiving the first clock signal, a second capacitor connected to a connection node of the second and fourth transistors and receiving the second clock signal, and a third transistor connected between the supply power source and the connection node of said second and fourth transistors.

The transfer circuit comprises a first PMOS transistor connected between the first output terminal and a first node to which the clock signal is input, a second PMOS transistor connected between the first output terminal and the second node, first and second NMOS transistors connected between the second node and a ground, and a third PMOS transistor connected between the second node and the second output terminal.

The negative charge pump circuit comprises a third capacitor connected to the second output terminal and receiving the third clock signal, and a fourth capacitor connected between the second output terminal and the third output terminal.

The output circuit comprises a fifth transistor connected between the third output terminal and the fourth output terminal and a sixth transistor connected between a gate electrode of the fifth transistor and the ground.

BRIEF DESCRIPTION OF THE DRAWINGS

For fuller understanding of the nature and objects of the present invention, reference should be had to the following detailed description taken in conjunction with the accompanying drawings in which.

DETAILED DESCRIPTION OF THE INVENTION

Figure 1:
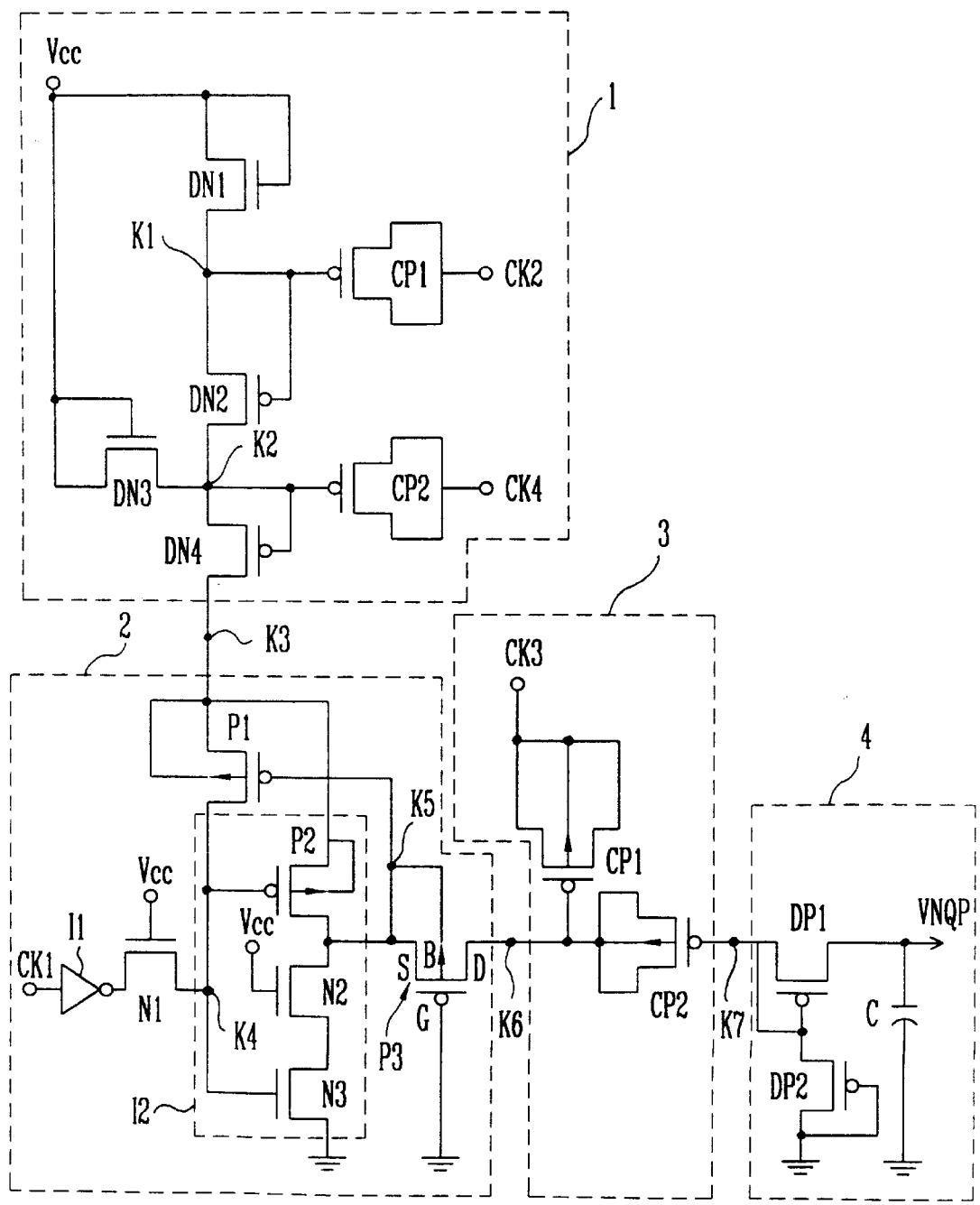
FIG. 1 is a circuitry diagram of a negative charge pump according to the present invention.

FIG. 1 is a circuitry diagram of a negative charge pump according to the present invention. The negative charge pump comprises a positive charge pump 1, a transfer circuit 2, a negative charge pump circuit 3 and an output circuit 4 which are connected in series from each other. The positive charge pump 1 generates a positive voltage in response to second and fourth clock signals CK2 and CK4. The transfer circuit 2 transfers the positive voltage to the negative charge pump circuit 3 according to a first clock signal CK1. The negative charge pump circuit 3 generates a negative voltage according to the third clock CK3. The output circuit 4 acts to discharge positive charges of external equipment to the negative charge pump circuit 3, the external equipment being connected to an output terminal VNQP of the output circuit 4, thereby maintaining a negative voltage at an output terminal VNQP of the output circuit 4.

Construction of the positive charge pump 1 is as follows.

A first, second and fourth transistors DN1, DN2 and DN4 which are operated as a diode, respectively, are connected in series between a supply power source Vcc and a third node K3. A second clock signal CK2 is supplied to a first node K1, which is a connection node of the first and second transistors DN1 and DN2, through a first capacitor CN1. A fourth clock signal CK4 is supplied to a second node K2, which is a connection node of the second and fourth transistors DN2 and DN4, through a second capacitor CN2. A third transistor DN3 which is operated as a diode is connected between the supply power source Vcc and the second node K2.

Construction of the transfer circuit 2 is as follows.

A first PMOS transistor P1 is connected between the third node K3 and a fourth node K4. A first clock signal CK1 is input to the fourth node K4 through a first inverter I1 and a first NMOS transistor N1 in which a gate electrode is connected to the supply power source Vcc. A second PMOS transistor P2, a second NMOS transistor N2 and a third NMOS transistor N3 are, in series, connected between the third node K3 and a ground, with a gate electrode of the second PMOS transistor P2 being connected to the fourth node K4, a gate electrodes of the second NMOS transistor N2 being connected to the supply power source Vcc, a gate electrode of the third NMOS transistor N3 being connected to the fourth node K4.

A third PMOS transistor P3 is connected between a fifth node K5, which is a connection node of the second PMOS transistor P2 and the second NMOS transistor N2, and a sixth node K6, with a gate electrode G of the third PMOS transistor P3 being connected to the ground, a source electrode S of the third PMOS transistor P3 being connected to the fifth node K5 and the gate electrode of the first PMOS transistor P1, a drain electrode D of the third PMOS transistor P3 being connected to the sixth node K6. The second PMOS transistor P2, the second NMOS N2 and the third transistor N3 act as an second inverter 12.

Construction of the negative charge pump circuit 3 is as follows.

A fourth capacitor CP2 is connected between the sixth node K6 and a seventh node K7. A third clock signal CK3 is inputted to the sixth node K6 through the third capacitor CP1.

Construction of the output circuit 4 is as follows.

A fifth transistor DP1, which is operated as a diode, is connected between the seventh node K7 and an output terminal VNQP. A sixth transistor, DP2 whis is operated as a diode, is connected between the seventh node K7 and the ground, with the seventh node K7 being connected to a gate electrode of the fifth reansistor DP1. A load capacitor C is connected between the output terminal VNQP and the ground.

Figure 2:
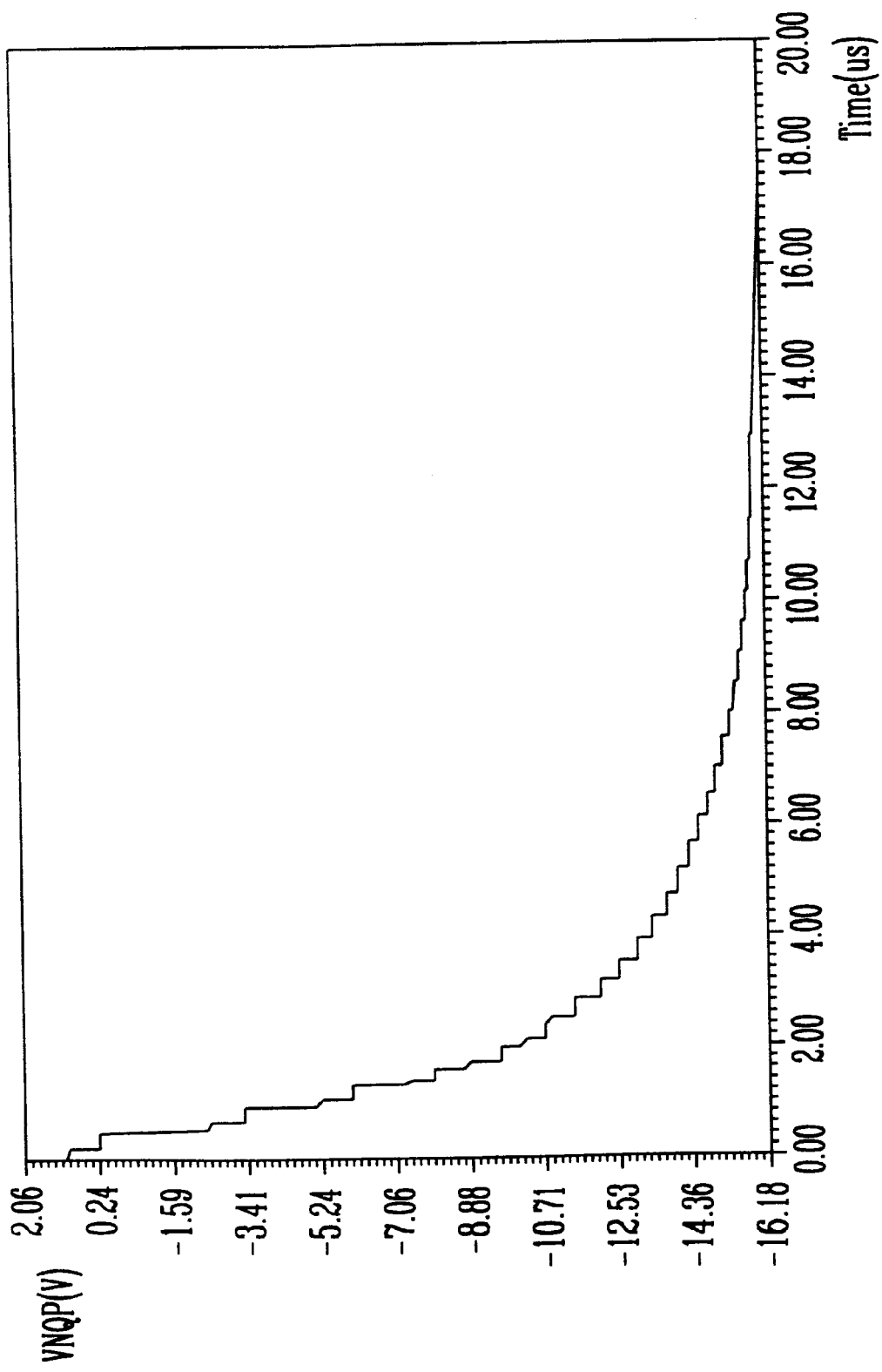
FIG. 2 is an output waveform for illustrating a pumping characteristic of a negative charge pump according to the present invention.

Electrical operation of the negative charge pump according to the present invention will be described with reference to FIG. 2.

When the second clock signal CK2 and the fourth clock signal CK4 are inputted to the positive charge pump 1, respectively, a positive voltage Vk3 is generated at the third node K3.

A voltage of the first node K1 is determined by following equation.

$$Vk1 = Vcc + Vck2 - Vth1 \quad (1)$$

Wherein,

Vk1 is a voltage of the first node;

Vcc is a voltage from the supply power source;

Vck2 is a voltage of the second clock signal CK2; and

Vth1 is a threshold voltage of the first transistor DN1.
A voltage of the second node K2 is determined by the following equation.

$$Vk2 = Vk1 + Vck4 - Vth2 \quad (2)$$

Wherein,

Vk2 is a voltage of the second node K2;

Vck4 is a voltage of the fourth clock signal CK2.

Vth2 is a threshold voltage of the second transistor DN2.
A voltage of the third node K3 is determined by the following equation.

$$Vk3 = Vk2 - Vth4 \quad (3)$$

Wherein,

Vk3 is a voltage of the third node K3.

Vk2 is a voltage of the second node K2.

Vth4 is a threshold voltage of the fourth transistor DN4.

Assuming that a voltage Vk3 of the third node K3 is a high voltage (Vcc+ΔV) and the first clock signal CK1 becomes a high level, the first clock signal CK1 is inverted to a low level by the first inverter I1 and transferred to the fourth node K4 through the first NMOS transistor NI. The second PMOS transistor P2 is turned on and the third NMOS transistor N3 is turned off since the fourth node K4 is maintained at a low level, whereby the voltage (Vcc+ΔV) of the third node K3 is transferred to the fifth node K5.

While, the first PMOS transistor P1 is turned off, whereby the fourth node K4 is latched to a low level. The voltage (Vcc+ΔV) of the fifth node K5 is transferred to the sixth node K6 through the third PMOS transistor P3. Voltage down is not occurred by the third PMOS transistor P3.

When the third clock signal CK3 having a high level is inputted to the negative charge pump circuit 3, the voltage (Vcc+ΔV) of the sixth node K6 is raised up as much as Vck3 which is a voltage of the third clock signal CK3. The voltage of the seventh node K7 is identical to that of the sixth node K6 due to the coupling effect of the fourth capacitor CP2. Hence, the fifth transistor DP1 and the sixth transistor DP2 are turned on.

When the first clock signal CK1 changes a high level to a low level, the second PMOS transistor P2 is turned off, while the third NMOS transistor N3 is turned on, whereby the potential of the fifth node K5 maintains a ground level. At this time, the potential of the sixth node K6 maintains a threshold voltage (Vthp3) of the PMOS transistor P3.

During the first clock signal CK1 maintains a low level, while the third clock signal CK3 changes a high level to a low level, the potential of the sixth node K6 becomes Vthp3-VCK3. The potential of the seventh node K7 is identical to that of the sixth node due to the coupling effect of the fourth capacitor CP2. Since the potential of the seventh node K7 downs below the ground level, positive charges which exist in an external equipment such as a substrate moves to the seventh node K7, through the output terminal VNQP and charge into the fourth capacitor CP2 through the fifth transistor DP1, thereby the output terminal VNQP maintains a negative voltage.

When the potential of the seventh node K7 is higher than the desired level, the fifth transistor DP1 is turned off and the above operation is performed, again. As shown in FIG. 2, a negative voltage, for example −18 volt, can be generated in time of 18 msec.

As described above, a negative voltage can be obtain in short time by utilizing a positive voltage of a positive charge pump. That is, according to the present invention, a pumping efficiency can be improved. Also, if the positive charge pump is manufactured by a local pump of a flash memory device, area of the device can be decreased. Furthermore, the present invention can increase integration of the device and decrease a pumping time since the present invention use not a plurality of diodes and pumping capacitors.

Many modifications and variations may be made in the techniques and structures described and illustrated herein without departing from the spirit and scope of the present invention. Accordingly, it should be understood that the techniques and structures described and illustrated herein are illustrative only and are not to be considered as limitations upon the scope and spirit of the present invention.

What is claimed is:

1. A negative charge pump using a positive high voltage comprising:

a positive charge pump to output a positive voltage through a first output terminal in response to a first clock signal and a second clock signal, wherein said positive charge pump comprises:

a first, second and fourth transistors which are connected in series between a supply power source and said first output terminal, with said first, second and fourth transistors operating as a diode, respectively;

a first capacitor connected to a connection node of said first and second transistors and receiving the first clock signal;

a second capacitor connected to a connection node of said second and fourth transistors and receiving the second clock signal;

a third transistor connected between said supply power source and the connection node and fourth transistors;

a transfer circuit having a second output terminal, wherein said transfer circuit acts to transfer the positive voltage of said first output terminal to said second output terminal or to not transfer the positive voltage in response to a third clock signal;

a negative charge pump circuit having a third output terminal which maintains a first potential while said second output terminal maintains the positive voltage and maintains a second potential in response to a fourth clock signal during the positive voltage is not supplied to said second output terminal; and an output circuit having a fourth output terminal, wherein said output circuit acts to discharge positive charges, which exist in an external equipment, to said third output terminal through said output circuit when the first potential charges to the second potential, whereby the fourth output terminal maintains a negative voltage.

2. The negative charge pump of claim 1, wherein said transfer circuit pump comprises:

a first PMOS transistor connected between said first output terminal and a first node to which the third clock signal is input, wherein a gate electrode of said first PMOS transistor connected to a second node;

a second PMOS transistor connected between said first output terminal and said second node, wherein a gate electrode of said second PMOS transistor is connected to said first node;

first and second NMOS transistors connected between said second ode and a ground, wherein a gate electrode of said first NMOS transistor is connected to said supply power source and a gate electrode of said second NMOS transistor is connected to said first node;

a third PMOS transistor connected between said second node and said second output terminal, wherein a gate electrode of said fourth PMOS transistor is connected to the ground.

3. The negative charge pump of claim 1, wherein said output circuit comprises:

a fifth transistor connected between said third output terminal dn said fourth output terminal, wherein said fifth transistor operates as a diode; and a sixth transistor connected between a gate electrode of said fifth transistor and the ground, wherein said sixth transistor operates as a diode.

4. A negative charge pump using a positive high voltage comprising:

a positive charge pump to output a positive voltage through a first output terminal in response to a first clock signal and a second clock signal, wherein said positive charge pump comprises:

a first, second and fourth transistors which are connected in series between a supply power source and said first output terminal, with said first, second and fourth transistors operating as a diode, respectively;

a first capacitor connected to a connection node of said first and second transistors and receiving the first clock signal;

a second capacitor connected to a connection node of said second and fourth transistors and receiving the second clock signal;

a third transistor connected between said supply power source and the connection node of said second and fourth transistors;

a transfer circuit having a second output terminal, wherein said transfer circuit acts to transfer the positive voltage of said first output terminal to said second output terminal or to not transfer the positive voltage according to an operation of an inverter which operates by a third clock signal;

a negative charge pump circuit having a third output terminal which maintains a first potential while said second output terminal maintains the positive voltage and maintains a second potential in response to a fourth clock signal during the positive voltage is not supplied to said second output terminal; and an output circuit having a fourth output terminal, wherein said output circuit acts to discharge positive charges, which exist in an external equipment, to said third output terminal through said output circuit when the first potential changes to the second potential, whereby the fourth output terminal maintains a negative voltage, wherein said output circuit comprises;

a fifth transistor connected between said third output terminal and said fourth output terminal, wherein said fifth transistor operates as a diode; and a sixth transistor connected between a gate electrode of said fifth transistor and the ground, wherein said sixth transistor operates as a diode.

5. A negative charge pump using a positive high voltage comprising;

a positive charge pump to output a positive voltage through a first output terminal in response to a first clock signal and a second clock signal, a transfer circuit having a second output terminal, wherein said transfer circuit acts to transfer the positive voltage of said first output terminal to said second output terminal or to not transfer the positive voltage in response to a third clock signal;

a negative charge pump circuit having a third output terminal which maintains a first potential while said second output terminal maintains the positive voltage and maintains a second potential in response to a fourth clock signal during the positive voltage is not supplied to said second output terminal; and an output circuit having a fourth output terminal, wherein said output circuit acts to discharge positive charges, which exist in an external equipment, to said third output terminal through said output circuit when the first potential changes to the second potential, whereby the fourth output terminal maintains a negative voltage and wherein said output circuit comprises;

a first transistor connected between said third output terminal and said fourth output terminal, wherein said fifth transistor operates as a diode; and a second transistor connected between a gate electrode of said fifth transistor and the ground, wherein said sixth transistor operates as a diode.

6. The negative charge pump of claim 5, wherein said positive charge pump comprises:

a first, second and fourth transistors which are connected in series between a supply power source and said first output terminal, with said first, second and fourth transistors operated as a diode, respectively;

a first capacitor connected to a connection node of said first and second transistors receiving the first clock signal;

a second capacitor connected to a connection node of said second and fourth transistors and receiving the second clock signal;

a third transistor connected between said supply power source and the connection node and fourth transistors.

7. The negative charge pump of claim 5, wherein said transfer circuit pump comprises:

a first PMOS transistor connected between said first output terminal and a first node to which the third clock signal is input, wherein a gate electrode of said first PMOS transistor is connected to a second node;

a second PMOS transistor connected between said first output terminal and said second node, wherein a gate electrode of said second PMOS transistor is connected to said first node;

first and second NMOS transistors connected between said second node and a ground, wherein a gate electrode of said first NMOS transistor is connected to said supply power source and a gate electrode of said second NMOS transistor is connected to said first node;

a third PMOS transistor connected between said second node and said second output terminal, wherein a gate electrode of said fourth PMOS transistor is connected to the ground.

* * * * *